United States Patent
Fukuda et al.

(10) Patent No.: US 8,233,060 B2
(45) Date of Patent: Jul. 31, 2012

(54) IMAGE DATA PROCESSING APPARATUS, IMAGE DATA PROCESSING METHOD, AND PROGRAM

(75) Inventors: Kyoko Fukuda, Kanagawa (JP); Yutaka Yoneda, Kanagawa (JP); Masatsugu Fukunaga, Kanagawa (JP)

(73) Assignee: Sony Corporation (JP)

( * ) Notice: Subject to any disclaimer, the term of this patent is extended or adjusted under 35 U.S.C. 154(b) by 500 days.

(21) Appl. No.: 11/922,155

(22) PCT Filed: Apr. 18, 2006

(86) PCT No.: PCT/JP2006/308494
§ 371 (c)(1),
(2), (4) Date: Dec. 13, 2007

(87) PCT Pub. No.: WO2006/134723
PCT Pub. Date: Dec. 21, 2006

(65) Prior Publication Data
US 2009/0290045 A1    Nov. 26, 2009

(30) Foreign Application Priority Data
Jun. 16, 2005   (JP) ............................... P2005-175961

(51) Int. Cl.
*H04N 5/76* (2006.01)
*H04N 11/02* (2006.01)
*H04N 11/04* (2006.01)
*G06K 9/00* (2006.01)

(52) U.S. Cl. ........... 348/231.99; 348/394.1; 375/240.03; 382/251

(58) Field of Classification Search ............... 348/231.2, 348/231.6, 231.99, 254, 384.1, 390.1, 394.1, 348/472, 671, 674; 375/240.02, 240.03, 375/240.4, 240.05, 240.06, 244, 245, 254; 382/251; 386/327, 328
See application file for complete search history.

(56) References Cited

U.S. PATENT DOCUMENTS
3,843,940 A * 10/1974 Ishiguro et al. ............... 375/245
(Continued)

FOREIGN PATENT DOCUMENTS
EP    1531399 A2    5/2005
(Continued)

OTHER PUBLICATIONS
Supplementary European Search Report EP 06732252, dated Feb. 16, 2011.

*Primary Examiner* — Aung S Moe
*Assistant Examiner* — Chriss Yoder, III
(74) *Attorney, Agent, or Firm* — Lerner, David, Littenberg, Krumholz & Mentlik, LLP

(57) ABSTRACT

Image data are compressed such that they do not visually deteriorate. Nonlinear compression and DPCM compression are performed in series. A compressing unit 41 that uses nonlinear transform inputs image data (L bits per pixel) of each color component. Image data are compressed to M bits (M<L) according to a compression transform tale TB1 that has been set up according to image information extracted from original image data. The compressing unit 41 performs compression transform having a characteristic similar to a gamma curve characteristic used in a gamma correction disposed downstream of the compressing unit 41. Image data compressed and transformed to M bits by the nonlinear compressing unit 41 are input to a DPCM compressing unit 42. The DPCM compressing unit 42 finally compresses input data to N bits (for example, N=10) according to a quantization table TB2. The compressed image data are stored to an image memory through a packing section 43.

6 Claims, 15 Drawing Sheets

U.S. PATENT DOCUMENTS

| | | | | |
|---|---|---|---|---|
| 4,454,546 A | * | 6/1984 | Mori | 382/238 |
| 5,065,229 A | * | 11/1991 | Tsai et al. | 348/391.1 |
| 5,384,849 A | * | 1/1995 | Jeong | 348/425.2 |
| 5,838,265 A | * | 11/1998 | Adolph | 341/50 |
| 5,892,847 A | * | 4/1999 | Johnson | 382/232 |
| 6,157,741 A | * | 12/2000 | Abe et al. | 382/233 |
| 6,694,061 B1 | * | 2/2004 | Acharya | 382/251 |
| 6,873,368 B1 | | 3/2005 | Yu et al. | |
| 6,917,441 B2 | * | 7/2005 | Suzuki et al. | 358/1.2 |
| 7,233,414 B2 | * | 6/2007 | Okada et al. | 358/3.01 |
| 2002/0044600 A1 | | 4/2002 | Scheirer et al. | |
| 2004/0114815 A1 | | 6/2004 | Shibaki et al. | |
| 2005/0141772 A1 | * | 6/2005 | Okada | 382/238 |
| 2005/0276496 A1 | * | 12/2005 | Molgaard et al. | 382/244 |

FOREIGN PATENT DOCUMENTS

| | | |
|---|---|---|
| JP | 2001-094985 A | 4/2001 |
| JP | 2001-257977 A | 9/2001 |

* cited by examiner

IMAGE DATA PROCESSING APPARATUS, IMAGE DATA PROCESSING METHOD, AND PROGRAM

TECHNICAL FIELD

The present invention relates to an image processing apparatus, in particular, an image data processing apparatus that processes image data captured by an image capturing apparatus such as a digital still camera or a camera recorder (an apparatus into which a video camera and a recorder are integrated), an image data processing method, and a program that causes a computer to execute the processing method.

BACKGROUND ART

In an image capturing apparatus such as a digital still camera or a camera recorder, when a shutter is pressed, a still picture is captured. For the captured original image data, internal signal processes such as a captured signal process and an encoding process are performed and then recorded for example to a detachable record medium. At this point, before the internal signal processes are performed for the captured original image data, they are temporarily stored in an image memory. The image memory is composed of a DRAM (Dynamic Random Access Memory), an SDRAM (Synchronous DRAM), or the like. As the number of pixels has increased in recent years, an image memory having a large storage capacity has become necessary. Thus, hardware cost and power consumption have adversely increased.

Thus, as described in Patent Document 1 (Japanese Patent Application Laid-Open No. 2002-111989), in an image capturing apparatus of the related art, captured original image data are compressed and stored in an image memory (an original image data buffer memory). Data that have been read from the image memory are decompressed and then the decompressed data are processed as described above. Compressing processes for original image data include DPCM process, Huffman encoding, arithmetic encoding for an original image signal, JPEG lossless encoding process that properly utilizes these processes, and universal encoding typified by Ziv-Lempel method.

In the DPCM process, the higher the correlativity of a pixel of interest and adjacent pixels becomes, the higher the compression ratio becomes. Thus, to obtain a high compression ratio, the DPCM process is effective for high order bits that have high correlativity, for example sixth to eighth bits of image data of 12 bits of one pixel. However, to do that, the DPCM process is not effective for low order bits that have low correlativity. In the DPCM, if an image that has low correlativity such as an edge of an image is compressed, the compressed image largely distorts. In the DPCM, an error propagates.

Compressed data that have been read from the image memory are decompressed and thereby original image data are obtained. For the original image data, signal processes such as Gamma correction, white balance correction, and linear matrix are performed. As a result, a luminance signal and two color difference signals are generated. The gamma correction is a process of which the camera side reversely corrects nonlinearity of light emitting characteristics of a Brown tube. In the gamma correction, the ratio of which image data having high luminance is compressed is high. Thus, according to characteristics of the gamma correction, a compressing system that uses nonlinear transform of which the ratio of which image data having high luminance is compressed is high has been proposed.

A compressing process that uses such nonlinear transform can be very easily structured. However, since the higher the compression ratio is, the more the information of low order bits is lost. As a result, image quality deteriorates as in solarization. Thus, it is difficult to obtain a high compression ratio. Solarization means a decrease of a developable concentration of a photographic emulsion because of excessive exposure. Visually, an image having a small number of quantizing bits, namely a rough gradation, is generated. As a result, the image quality of a flat image remarkably deteriorates.

Thus, in the compressing processes of the related art, compression distortions differ in their types. In any compressing process, there is a tendency that the higher the compression ratio is, the more the image quality deteriorates.

Thus, an object of the present invention is to provide an image data processing apparatus, an image data processing method, and a program that allow encoding efficiency to be improved so as to improve the image quality.

DISCLOSURE OF THE INVENTION

To solve the foregoing problem, the present invention is an image data processing apparatus which compresses original image data captured by an imaging device, comprising:

means for obtaining signals of same color components of color filters;

first compressing means for performing a first compressing process of compressing L bits to M (<L) bits for each pixel of image data separated into the same color components;

second compressing means, connected to the first compressing means in series, for performing a second compressing process, which is different from the first compressing process in characteristics of distortion which occurs, of compressing M bits to N (<M) bits for each pixel;

an image memory for storing data compressed by the second compressing means;

second decompressing means for performing a second decompressing process, which is a reverse process of the second compressing process, of decompressing N bits to M bits for each pixel of data stored in the image memory;

first decompressing means, connected to the second decompressing means in series, for performing a first decompressing process, which is a reverse process of the first compressing process, of decompressing M bits to L bits for each pixel of output data of the second decompressing means; and signal processing means for performing a signal process including gamma correction for image data which are output from the first decompressing means.

The present invention is an image data processing method of compressing original image data captured by an imaging device, the method comprising the steps of:

extracting signals of same color components of color filters;

performing a first compressing process of compressing L bits to M (<L) bits for each pixel of image data separated into the same color components;

performing a second compressing process, which is different from the first compressing process in characteristics of distortion which occurs, of compressing M bits to N (<M) bits for each pixel, the second compressing step being performed after the first compressing step;

storing data compressed at the second compressing step to an image memory;

performing a second decompressing process, which is a reverse process of the second compressing process, of decompressing N bits to M bits for each pixel of data stored in the image memory;

performing a first decompressing process, which is a reverse process of the first compressing process, of decompressing M bits to L bits for each pixel of output data of the second decompressing step, the first decompressing step being preformed after the second decompressing step; and performing a signal process including gamma correction for image data decompressed at the first decompressing step.

The present invention is a program which causes a computer to execute an image data processing method, the method comprising the steps of:

extracting signals of same color components of color filters of a imaging device;

performing a first compressing process of compressing L bits to M (<L) bits for each pixel of image data separated into the same color components;

performing a second compressing process, which is different from the first compressing process in characteristics of distortion which occurs, of compressing M bits to N (<M) bits for each pixel, the second compressing step being performed after the first compressing step;

storing data compressed at the second compressing step to an image memory;

performing a second decompressing process, which is a reverse process of the second compressing process, of decompressing N bits to M bits for each pixel of data stored in the image memory;

performing a first decompressing process, which is a reverse process of the first compressing process, of decompressing M bits to L bits for each pixel of output data of the second decompressing step, the first decompressing step being preformed after the second decompressing step; and performing a signal process including gamma correction for image data decompressed at the first decompressing step.

According to the present invention, by combining a plurality of compression methods that differ in characteristics, a compression distortion is dispersed to noises having different characteristics. Since a visual deterioration is suppressed, a high compression ratio can be accomplished.

BEST MODES FOR CARRYING OUT THE INVENTION

Figure 1:
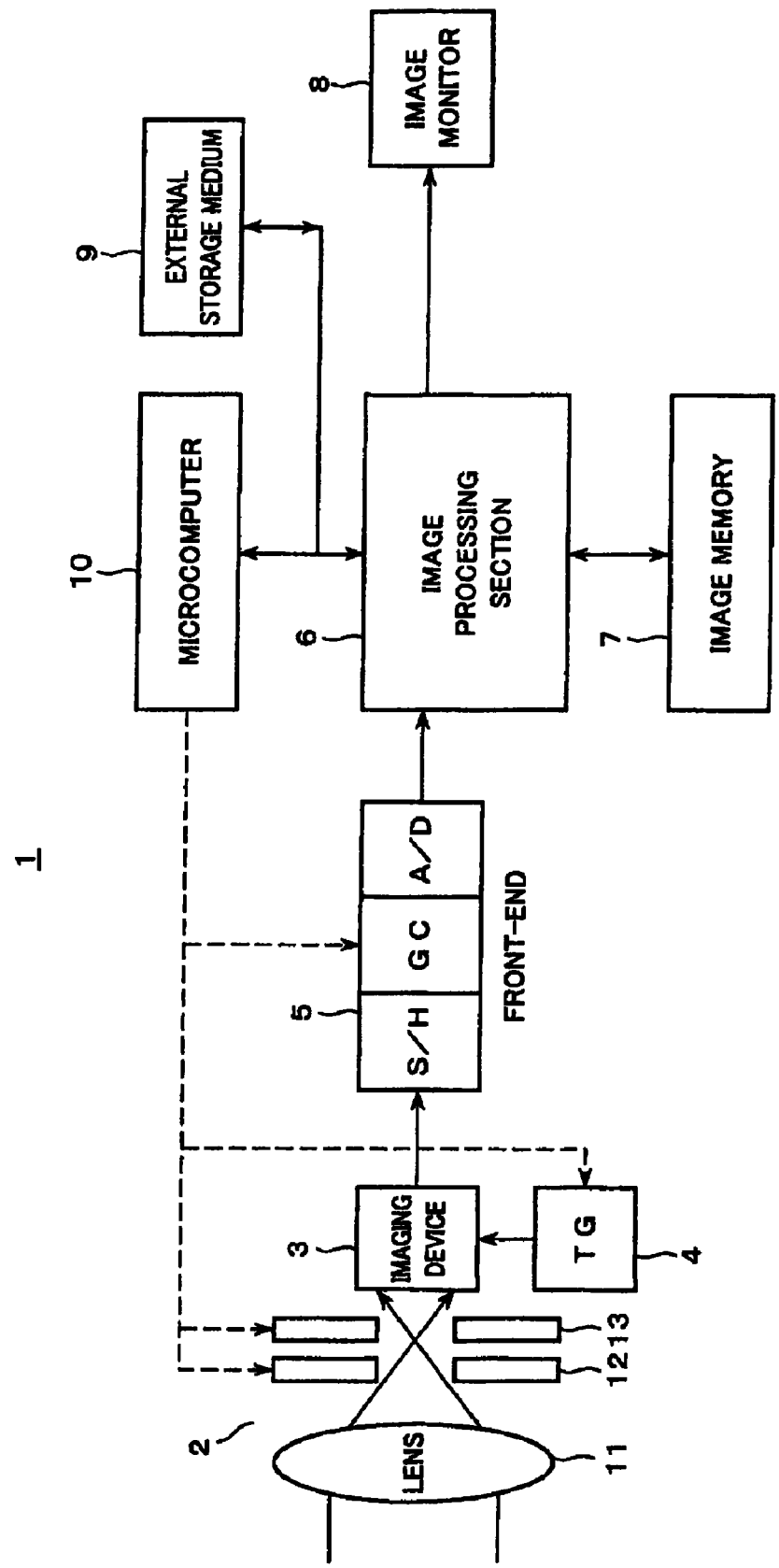
FIG. 1 is a block diagram showing the structure of an image capturing apparatus according to an embodiment of the present invention.

Next, with reference to the accompanying drawings, an embodiment of the present invention will be described. FIG. 1 shows an example of the structure of an image capturing apparatus 1 according to the embodiment of the present invention. The image capturing apparatus 1 has a lens section 2, an imaging device 3, a timing generating section 4, a front-end 5, an image processing section 6, an image memory 7, an image monitor 8, an external storage medium 9, and a camera controlling microcomputer 10.

The lens section 2 collects light from a subject. The lens section 2 includes a lens 11, a diaphragm 12, and a shutter 13. The diaphragm 12 controls the amount of light. The shutter 13 blocks the passage of light so as to control exposure. The diaphragm 12 may also have a function of the shutter 13. The diaphragm 12 and the shutter 13 are controlled by the camera controlling microcomputer 10.

The imaging device 3 is an image sensor such as a CCD (Charge Coupled Device) or a CMOS sensor (Complementary Metal Oxide Semiconductor sensor) and converts light information of the subject into an electric signal. Disposed on the front surface of the sensor are a plurality of color filters such as three primary color filters or complementary filters. The timing generating section 4 drives the imaging device 3. The timing generating section 4 also controls exposure of high speed-low speed electronic shutters, and so forth. The timing generating section 4 is controlled by the camera controlling microcomputer 10.

The front-end 5 converts an analog signal that is output from the imaging device 3 into a digital signal. The front-end 5 performs processes such as correlatively dual sampling that removes a noise component from an image signal captured by the imaging device 3 and obtains the captured image signal, gain control that controls the level of the captured image signal, and A/D conversion that converts an analog signal into a digital signal. The front-end 5 is controlled by the camera controlling microcomputer 10.

The image processing section 6 performs various types of digital signal processes according to captured image data captured by the imaging device 3 and converted into the digital signal so as to generate a luminance signal and color signals. The image processing section 6 has a function of encoding image data into a predetermined file format such as JPEG (Joint Photographic Experts Group).

The image memory 7 is a storage device that temporarily stores image data for signal processes of the image processing section 6. The image memory 7 is for example a DRAM (Dynamic Random Access Memory), an SDRAM (Synchronous DRAM), or the like. When the image memory 7 stores original image data supplied from the front-end 5, data compressed by the image processing section 6 are stored in the image memory 7 so as to save the memory capacity.

The image monitor 8 is a monitor on which the user checks an image captured by the imaging device 3 (this image is referred to as a through-image). In addition, the image monitor 8 displays a menu on which the user operates the image capturing apparatus. Moreover, the image monitor 8 displays reproduced image data. The image monitor 8 is for example an LCD panel (Liquid Crystal Display Panel). The external storage medium 9 is a record medium that stores image data. The external storage medium 9 may be typified by a flash memory as a rewritable nonvolatile memory.

The camera controlling microcomputer 10 controls the entire image capturing apparatus 1. In other words, the camera control microcomputer 10 performs exposure control of the diaphragm 12, open/close control of the shutter 13, electronic shutter control of the timing generating section 4, gain control of the front-end 5, and mode and parameter controls of the image processing section 6.

Figure 2:
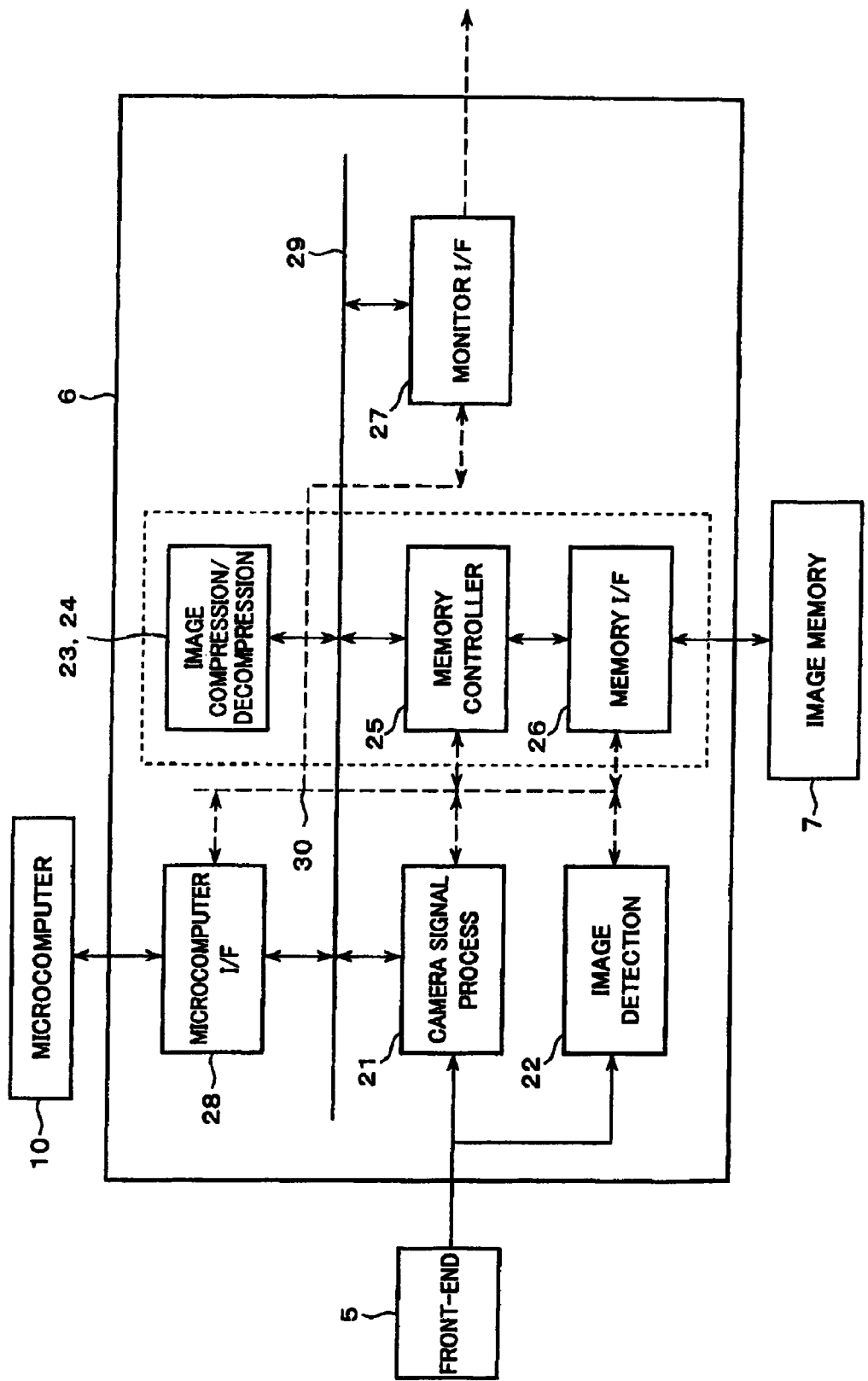
FIG. 2 is a block diagram showing an example of an image processing section according to the embodiment of the present invention.

FIG. 2 shows an example of the structure of the image processing section 6 according to the embodiment of the present invention. The image processing section 6 has a signal processing section 21, a detecting section 22, a compressing section 23, a decompressing section 24, a memory controller 25, a memory interface 26, a monitor interface 27, and a microcomputer interface 28. These sections are mutually connected by a data bus 29 and a control bus 30. In FIG. 2, the flow of image data is represented by solid lines and the flow of control data is represented by broken lines.

The signal processing section 21 corrects the original image information (raw data) digitized by the front-end 5 with respect to the imaging device 3. Namely, the signal processing section 21 corrects defects of the original image information. The compressing section 23 compresses original image data that have been corrected and writes the compressed data to the image memory 7 through the memory controller 25 and the memory interface 26. The compressed data are read from the image memory 7 and decompressed by the decompressing section 24. The decompressing section 24 outputs original image data.

The original image data that have been read from the image memory 7 and that have been decompressed are supplied to the signal processing section 21. The signal processing section 21 performs digital signal processes such as digital clamp, white balance, gamma correction, interpolation calculation, filter calculation, matrix calculation, luminance generation calculation, and color generation calculation so as to generate an image signal composed of a luminance signal and color difference signals. The signal processing section 21 generates image data encoded according to a predetermined file format such as JPEG.

The present invention can be also applied to a structure that performs signal processes for original image data, compresses an image signal composed of a luminance signal and color difference signals and writes the compressed image signal to the image memory. In addition, as with the image memory 7, compressed image data may be stored to the external storage medium 9 as well as the image memory 7.

The detecting section 22 performs a detecting process of controlling the camera for the captured image. Detected signals of the detecting section 22 are for example a detected signal with respect to auto focus, a detected signal with respect to automatic exposure control, and so forth. The detecting section 22 detects an edge component of the luminance of an auto focus detection area that has been set up at a predetermined position of the captured image as a detected signal with respect to auto focus, detects the edge component, cumulates the edge components, and outputs a contrast value as the cumulated edge components. In addition, the detecting section 22 detects the luminance of the detection area of the luminance that has been set up at the predetermined position on the captured image as a detected signal with respect to automatic exposure control and outputs the luminance level.

When a still image is captured, the compressing section 23 compresses a captured image of each color supplied from the front-end 5. The memory interface 26 packs the compressed image data with the bus width of the image memory 7. The packed data are temporarily stored in the image memory 7 through the memory interface 26. On the other hand, compressed data are read from the image memory 7 to the memory interface 26. The memory interface 26 depacks the compressed data. Thereafter, the decompressing section 24 decompresses the depacked image data for signal processes of the signal processing section 21.

The memory controller 25 exchanges image data between sections of the image processing section 6 and between each section of the image processing section 6 and the image memory 7 and controls the data bus 29. The memory interface 26 exchanges image data and compressed data with the image memory 7 for signal processes of the image processing section 6. The monitor interface 27 converts image data into various types of display formats for the image monitor 8. For example, an NTSC encoder that displays the image data on an NTSC monitor is known. The microcomputer interface 28 exchanges control data and image data between the camera controlling microcomputer 10 and the image processing section 6 that the camera control microcomputer 10 controls.

Figure 3:
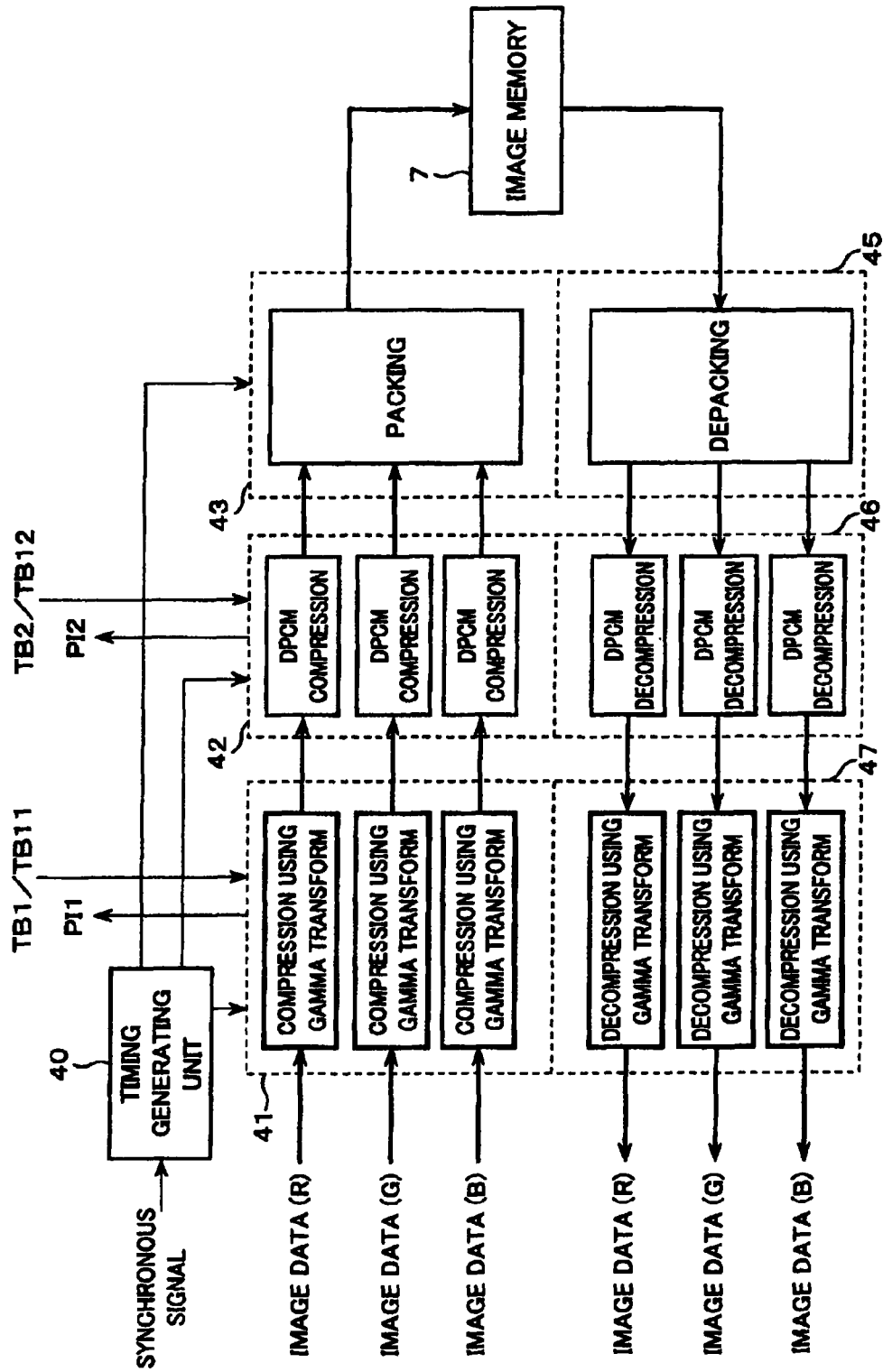
FIG. 3 is a block diagram showing an example of the structure of a compressing/decompressing unit according to the embodiment of the present invention.

FIG. 3 shows the compressing section 23, the decompressing section 24, the memory controller 25, and the memory interface 26 of the image processing section 6 as functional structures. This image processing apparatus performs a first compressing process and a second compressing process that are different processes. The image processing apparatus performs a nonlinear process as the first compressing process. The image processing apparatus performs DPCM compression as the second compressing process. An image distortion that occurs in the first compressing process differs from an image distortion that occurs in the second compressing process. It appears that image distortions depend on compressing systems. Thus, there may be various types of pairs of compressing systems that can be combined in series. For example, compressing circuits such as nonlinear compression and ADRC (Adaptive Dynamic Range Coding) can be combined. Instead, three or more types of compressing systems may be combined.

Next, with reference to FIG. 3, a process of compressing L bits (for example, L=14) of a still image to N (N<L) bits (for example N=10) will be described. Since the compressing operation and the decompressing operation are not simultaneously performed, the structure shown in FIG. 3 is shared thereby.

A horizontal synchronous signal, a vertical synchronous signal, an enable signal, and so forth of the image data are input to a timing generating unit 40. The timing generating unit 40 generates a timing signal and a control signal for compressing units 41 and 42, decompressing units 46 and 47, a packing section 43, a depacking section 45, the image memory 7, and so forth.

Image data (L bits per pixel) of color components of three primary color signals are input to the compressing unit 41 that uses nonlinear transform. Luminance information is extracted for example as image information PI1 from the original image data supplied from the front-end 5. The information PI1 is output to the microcomputer 10. The microcomputer 10 identifies a characteristic of the input image from the information and sets up a compression transform table TB1 suitable for the information. The compression transform table TB1 that has been set up is fed back to the compressing unit 41 that uses nonlinear transform. The image information PI1 may be information for automatic exposure control obtained by the detecting section 22.

The compressing unit 41 that uses nonlinear transform compresses the image data to M bits (M<L), for example M=12, according to the compression transform table TB1. The compressing unit 41 performs compression and transform with characteristics similar to gamma curve characteristics of gamma correction of the signal processing section 21 (see FIG. 1) disposed on the next stage of the compressing unit 41 so as to weight image data in the same manner as does the signal processing section 21.

Figure 4:
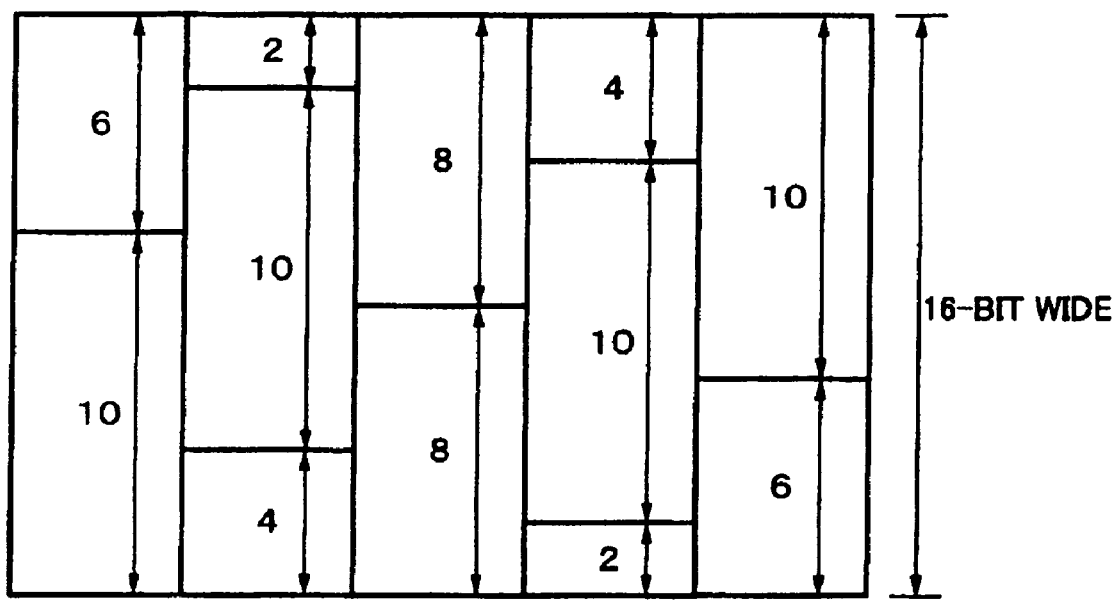
FIG. 4 is a schematic diagram describing packing to a data bus width of an image memory.

Image data that have been compressed and transformed to M bits by nonlinear transform of the compressing unit 41 are input to the DPCM compressing unit 42. The DPCM compressing unit 42 compresses the transformed image data to N bits (for example, N=10) according to a quantization table TB2. Information PI2 is generated to set up a quantization table TB2. The compressed image data are input to the packing section 43. The compressed image data are packed with the bus width of the image memory and then stored in the image memory 7. FIG. 4 shows an example of packed image data in the case that the path width is 16 bits. In this embodiment, the compression ratio of the compressing unit 41 that uses nonlinear transform is ¼ and the compression ratio of the DPCM compressing unit 42 is ¼. As a result, a compression ratio of 1/16 is accomplished.

Next, with reference to FIG. 3, a process of decompressing N bits to L bits will be described. The decompressing process is a process performed in the reverse order of the foregoing compressing process. As in the compressing process, the decompressing process is performed for each color signal of three primary color components. Image data stored in the image memory 7 are read and input to the depacking section 45. Compressed data multiplexed with the bus width are depacked to N bits of image data by the depacking section 45. The depacked image data are input to the decompressing unit 46 as a second decompressing means.

The DPCM decompressing unit 46 decompresses N bits to M bits according to a reverse transform table TB12. The decompressed image data are input to the decompressing unit 47 that uses nonlinear transform as a first decompressing means. The decompressing unit 47 decompresses the image data to L bits as original bits according to a decompression table TB11 paired with the compression transform table TB1 selected by the compressing unit 41. The decompressing unit 47 that uses nonlinear transform supplies L bits of original image data of each color component to the signal processing section 21 (see FIG. 2). The signal processing section 21 generates an image signal composed of a luminance signal and color difference signals by digital signal processes such as digital clamp, white balance, gamma correction, interpolation calculation, filter calculation, matrix calculation, luminance generation calculation, and color generation calculation.

Figure 5:
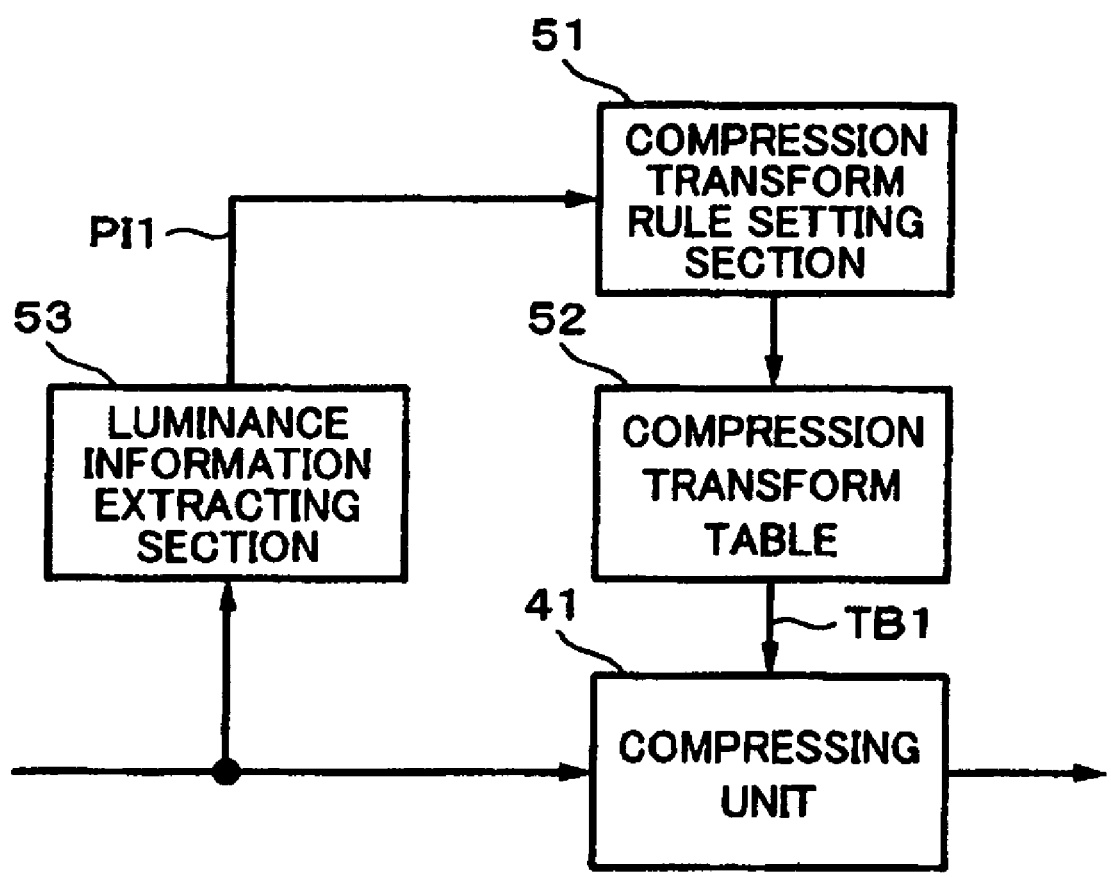
FIG. 5 is a block diagram showing an example of the structure of a compressing unit that uses nonlinear transform.

FIG. 5 shows a structure that uses nonlinear transform to compress data. Image data of a particular color are supplied to the compressing unit 41 and a luminance extracting section 53. The luminance extracting section 53 extracts the image information PI1 corresponding to luminance from original image data supplied from the front-end 5. The extracted image information PI1 is supplied to a compression transform rule setting section 51.

The compression transform rule setting section 51 sets up a compression transform rule to a compression transform table 52 according to the extracted luminance information PI1. In other words, characteristics of a compression transform table are set up according to a compression transform rule. A compression transform table TB1 that has been set up is supplied to the compressing unit 41. The compressing unit 41 performs a compressing process that uses nonlinear transform according to the compression transform table TB1. M bits of data that have been compressed are supplied to the next staged DPCM compressing unit 42 disposed on the next stage of the compressing unit 41. Information that identifies characteristics of the compression transform table that is used is associated with compressed data that are transmitted. When the compressed data are decompressed, the information is used to represent a decompression transform table. This information may be stored in the microcomputer 10.

Figure 6:
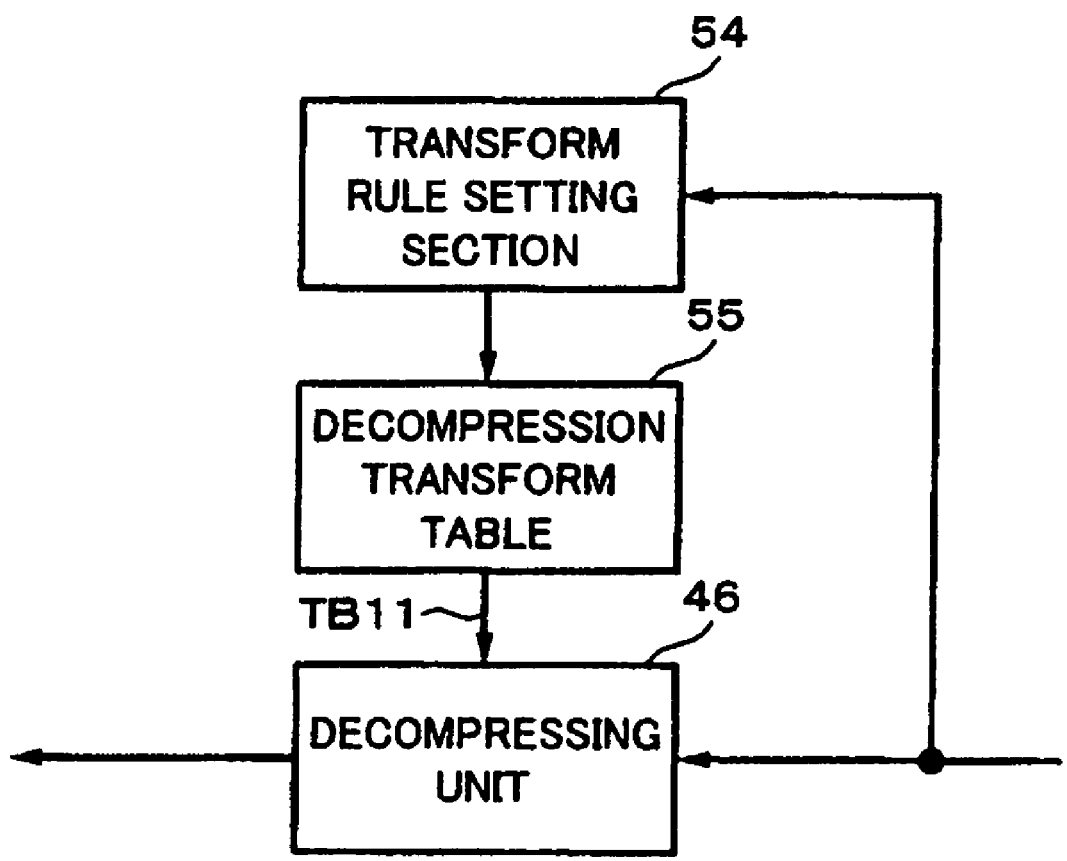
FIG. 6 is a block diagram showing an example of the structure of a decompressing unit.

FIG. 6 shows a structure that uses nonlinear transform to decompress data. Data that have been read from the image memory 7 and decompressed to M bits by the DPCM decompressing unit 46 are supplied to a transform rule setting section 54 and the decompressing unit 46 that uses nonlinear transform. The transform rule setting section 54 outputs a decompression transform table TB11 paired with a compression transform table used in a compressing process from a decompression transform table 55. The decompressing unit 46 decompresses data to N bits according to the decompression transform table TB11.

Figure 7:
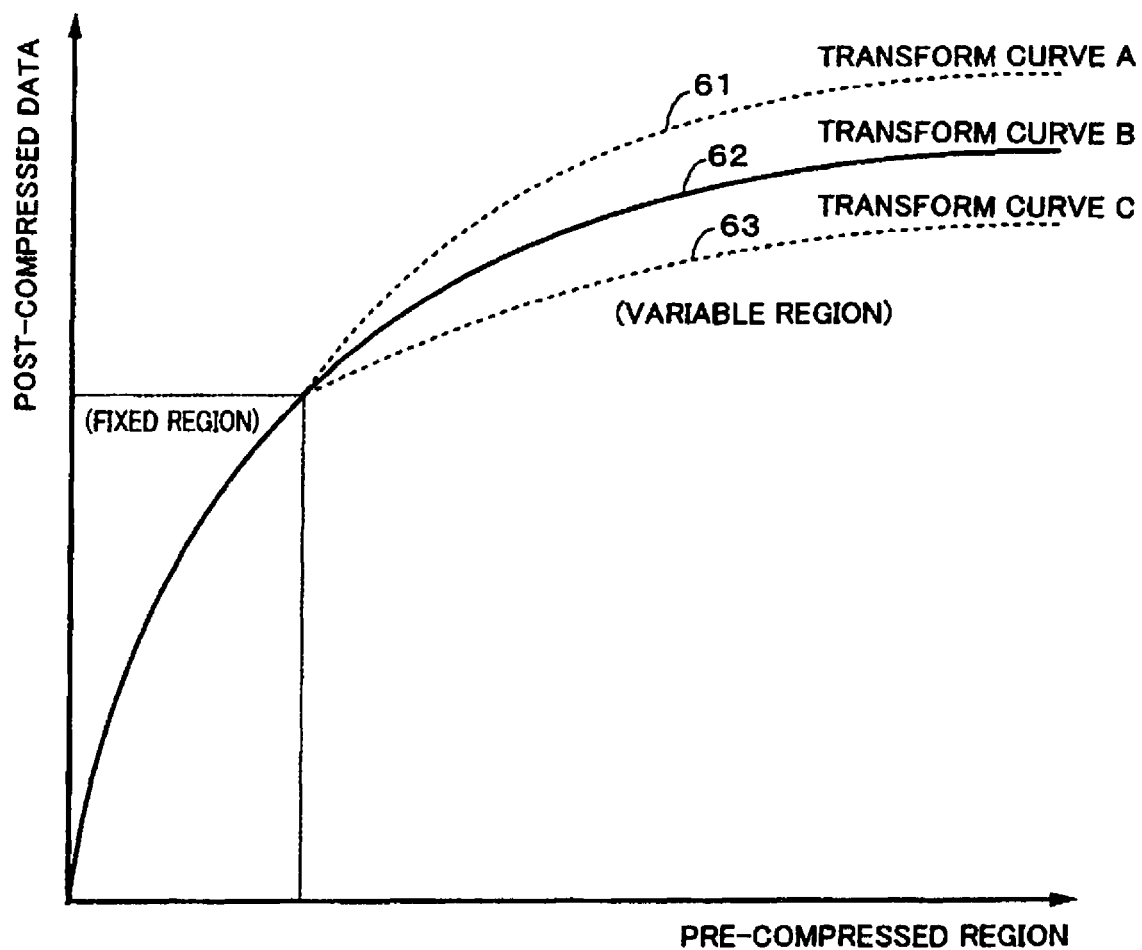
FIG. 7 is a schematic diagram describing a transform curve of the compressing unit that uses nonlinear transform.

FIG. 7 shows examples of curves according to the compression transform table TB1. The compression transform table TB1 is composed of a set of compression pairs of pre-compressed data and post-compressed data. The compressing unit 41 compresses data with reference the conversion pairs of the compression transform table TB1. The compression transform table TB1 is composed of a fixed region and a variable region. In the fixed region, each transform pair is fixed. In the variable region, the compression transform rule setting section 51 can change conversion pairs.

In the example shown in FIG. 7, there are three types of transform curves 61, 62, and 63 in the variable region. These curves are selected according to the luminance information PI1 extracted by the luminance extracting section 53. When luminance information is extracted for each frame, transform curves are changed for each frame. When the extracted luminance is low, the transform curve 61 is used. When the extracted luminance is intermediate, the transform curve 62 is used. When the extracted luminance is high, the transform curve 63 is used. It is preferred that these transform curves 61, 62, and 63 be similar to gamma correction curves used in the signal processing section 21.

Figure 8:
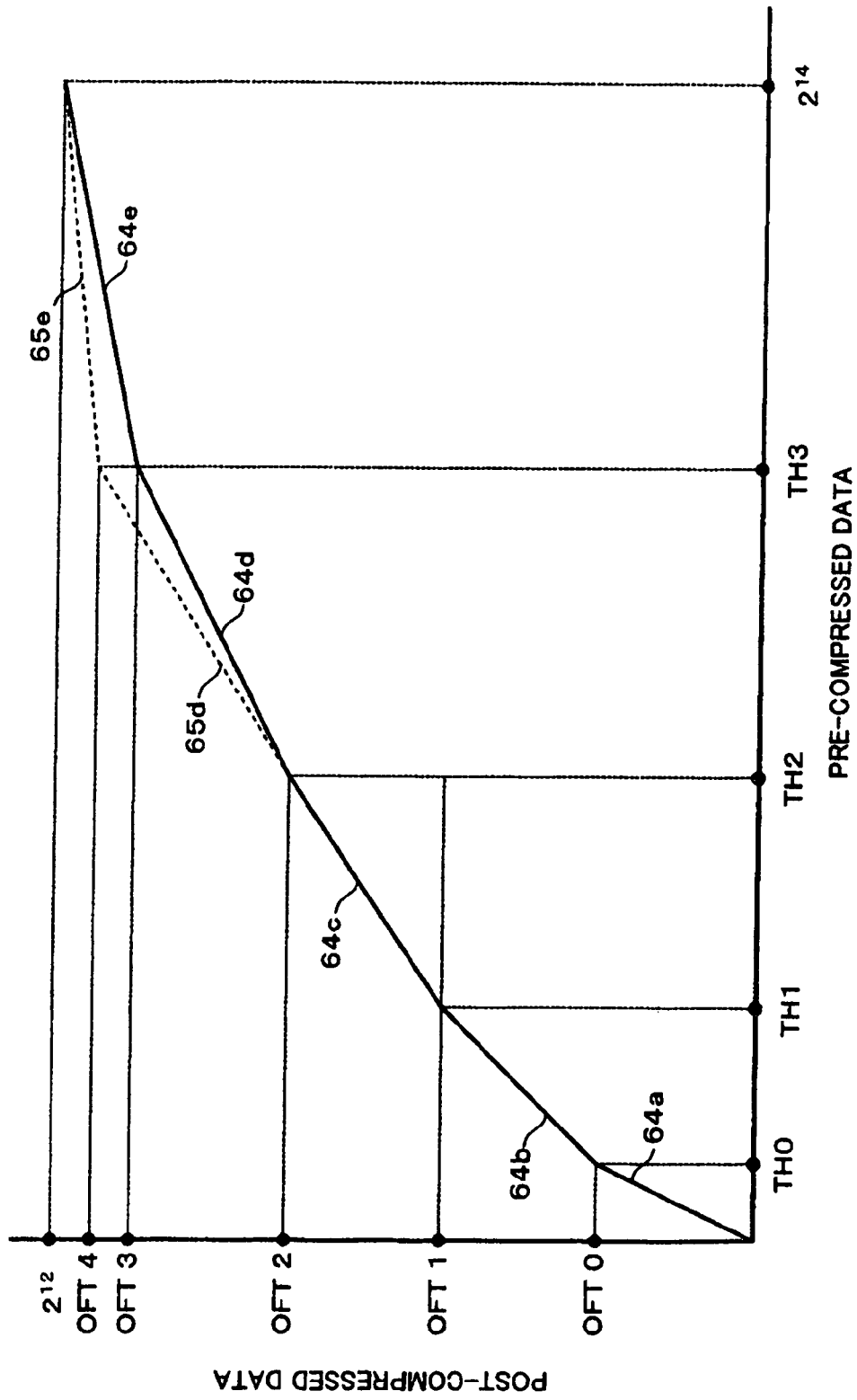
FIG. 8 is a schematic diagram showing an example of which the transform curve of the compressing unit that uses nonlinear transform is represented by a broken line curve.

As shown in FIG. 8, the compression transform table TB1 is approximated by broken line curves as shown in FIG. 8. For example, a broken line curve is defined by threshold values TH0, TH1, TH2, and TH3 and offsets OFT0, OFT1, OFT2, and OFT3. In other words, (TH0, OFT0) defines a straight line 64a. (TH1, OFT1) defines a straight line 64b. (TH2, OFT2) defines a straight line 64c. (TH3, OFT3) defines a straight line 64d. $2^{14}$ as the maximum value of the pre-compressed data and $2^{12}$ as the maximum value of the post-compressed data define a straight line 64e. The larger the suffix of the straight line is, the smaller the slope of the straight line becomes. For example, the straight lines 64a, 64b, and 64c are fixed, whereas the straight lines 64d and 64e are variable.

Pre-compressed data are compared with each threshold value and one of ranges of the five lines 64a to 64e in which the pre-compressed data are contained is decided. Since each straight line is represented as a linear function, the value of post-compressed data on each straight line can be obtained by a linear interpolation. In addition, by changing a threshold value or an offset, characteristics of the compression transform table can be changed according to the extracted luminance information PI1. When the offset OFT3 is changed to the offset OFT4, the straight lines 64d and 64e can be changed to the straight lines 65d and 65e, respectively.

It is not necessary to divide a transform curve into a fixed region and a variable region. Instead, a whole curve may be variable. In addition, values other than offsets as representative values may be obtained by non-linear interpolations instead of linear interpolations.

Figure 9:
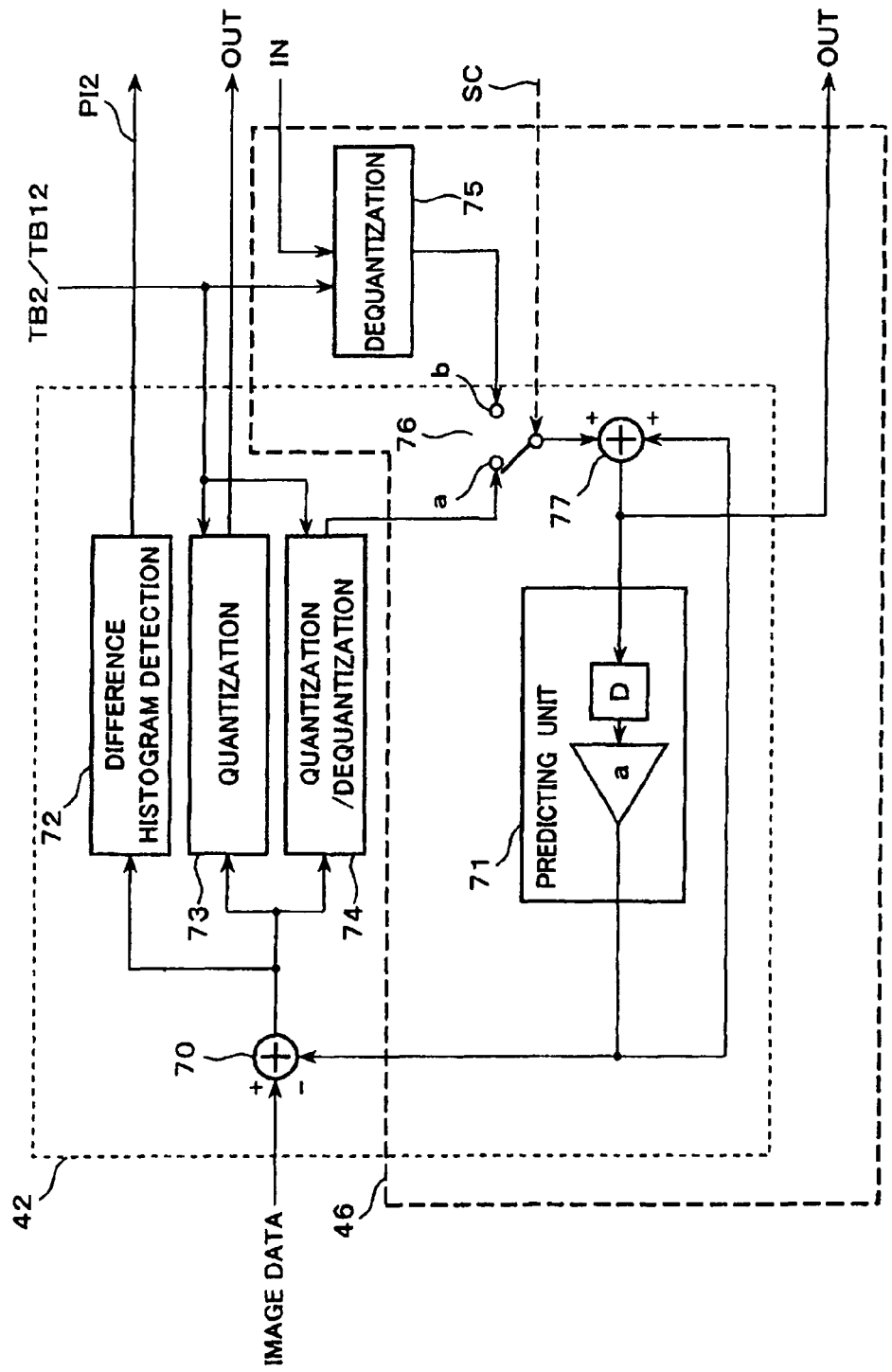
FIG. 9 is a block diagram showing an example of the structure of a DPCM compressing/decompressing unit according to the embodiment of the present invention.

FIG. 9 shows the DPCM compressing units 42 and 46 that share a circuit for a compressing operation and a circuit for a decompressing operation. The compressing unit 41 that uses nonlinear transform supplies input image data of which L bits, for example 14 bits, have been compressed to M bits, for example 12 bits, to a subtracting unit 70. The subtracting unit 70 obtains a prediction error of a prediction value predicted from a past pixel defined with a delay element D by a predicting unit 71, for example a pixel on the same line as and adjacent to a pixel of interest. In the predicting unit 71, "a" represents a weighting coefficient with which a prediction value is generated.

The prediction error is input to a difference histogram detecting unit 72, a quantizing unit 73, and a quantizing/dequantizing unit 74. The quantizing/dequantizing unit 74 has a structure that simultaneously performs a quantizing process and a dequantizing process of transforming a quantized value into a representative value. The quantizing/dequantizing unit 74 has a quantizing characteristic that is the same as a quantizing characteristic that the quantizing unit 73 has and a dequantizing characteristic that a dequantizing unit 75 has. Output data of the quantizing/dequantizing unit 74 are supplied to an adding unit 77 through a selector 76.

When data are compressed, the selector 76 selects an input terminal "a" according to a compression/decompression switching signal SC. When data are decompressed, the selector 76 selects an input terminal "b" according to the compression/decompression switching signal SC. When data are compressed, data of which an output of the quantizing/dequantizing unit 74 and an output of the predicting unit 71 are added by the adding unit 77 are supplied to the subtracting unit 70. The subtracting unit 70 calculates a prediction error. By disposing a quantizing unit in a feedback loop and providing a circuit having the same structure as the decompressing unit, a quantizing noise that occurs in the quantizing unit can be prevented from cumulating in the decompressing unit.

The difference histogram detecting unit 72 generates a histogram that represents occurrence frequencies of prediction errors of one captured still image and outputs the values as the image information PI2. It appears that a histogram obtained by the difference histogram detecting unit 72 largely deviates depending on an image signal. The quantization table TB2 used in the quantizing unit 73 and the quantizing/dequantizing unit 74 is adaptively changed according to the detected histogram so as to effectively compress data. When data are compressed, compressed data of which data have been compressed to N bits, for example 10 bits, are obtained from the quantizing unit 73. The obtained compressed data are written to the image memory 7.

Data that have been read from the image memory 7 are supplied to the dequantizing unit 75. The dequantizing unit 75 decompresses N bits to M bits according to the reverse transform table TB12 compared with the quantization table TB2 used in the quantizing unit 73. Information that represents a reverse transform table to be selected is stored in the image memory 7. Instead, a reverse transform table may be set up according to information supplied from the microcomputer 10.

A prediction error that has been decompressed to M bits is supplied from the dequantizing unit 75 to the adding unit 77 through the selector 76. A prediction value generated by the predicting unit 71 is fed back to the adding unit 77 and a restored value is obtained from the adding unit 77. The restored value is supplied to the decompressing unit 47 that uses nonlinear transform.

Figure 10A:
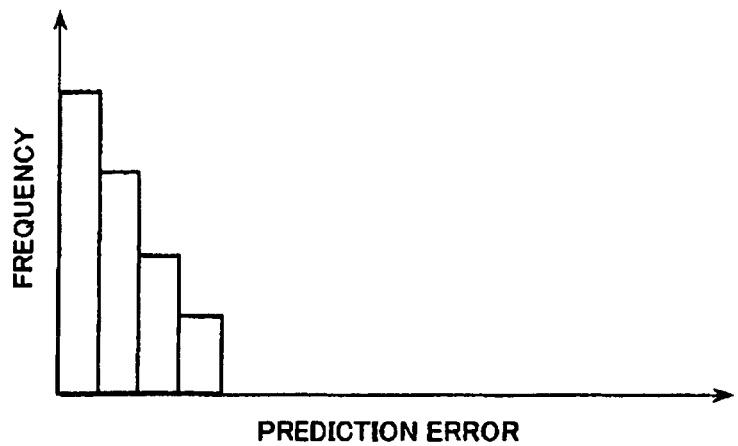
FIG. 10A, FIG. 10B, and FIG. 10C are schematic diagrams showing examples of histograms of level distributions of images used to select quantization tables of the DPCM compressing unit according to the embodiment of the present invention.
Figure 10B:
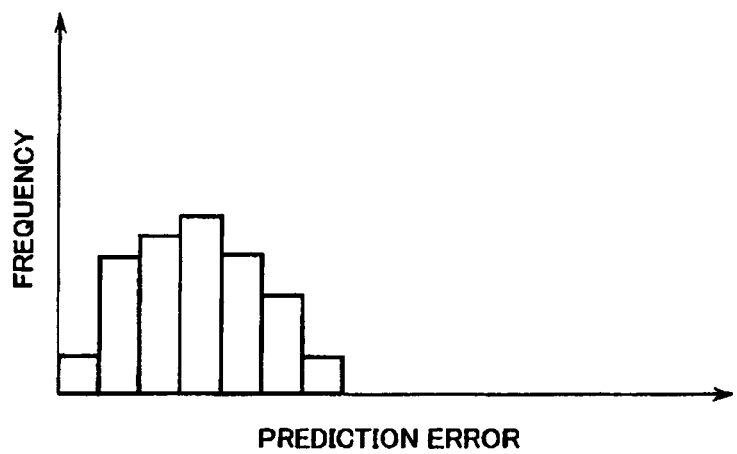
Figure 10C:
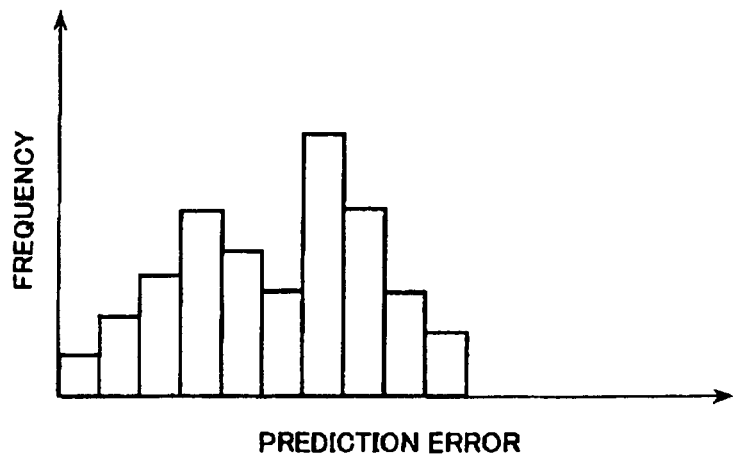

FIG. 10A, FIG. 10B, and FIG. 10C show schematic examples of histograms that represent occurrence frequencies of prediction errors obtained as an output of the subtracting unit 70. In these drawings, the horizontal axis and the vertical axis represent prediction errors and frequencies, respectively. Prediction errors increase in the direction of the horizontal axis. Instead, the range of the minimum value and the maximum value of prediction errors may be divided by a predetermined number and the occurrence frequencies of each of the divided ranges may be detected. For example, occurrence frequencies of prediction errors of one image are obtained. A histogram is generated according to the obtained occurrence frequencies. The quantization table TB2 used for nonlinear compression of the quantizing unit 73 and the quantizing/dequantizing unit 74 is set up according to the generated histogram.

Figure 11:
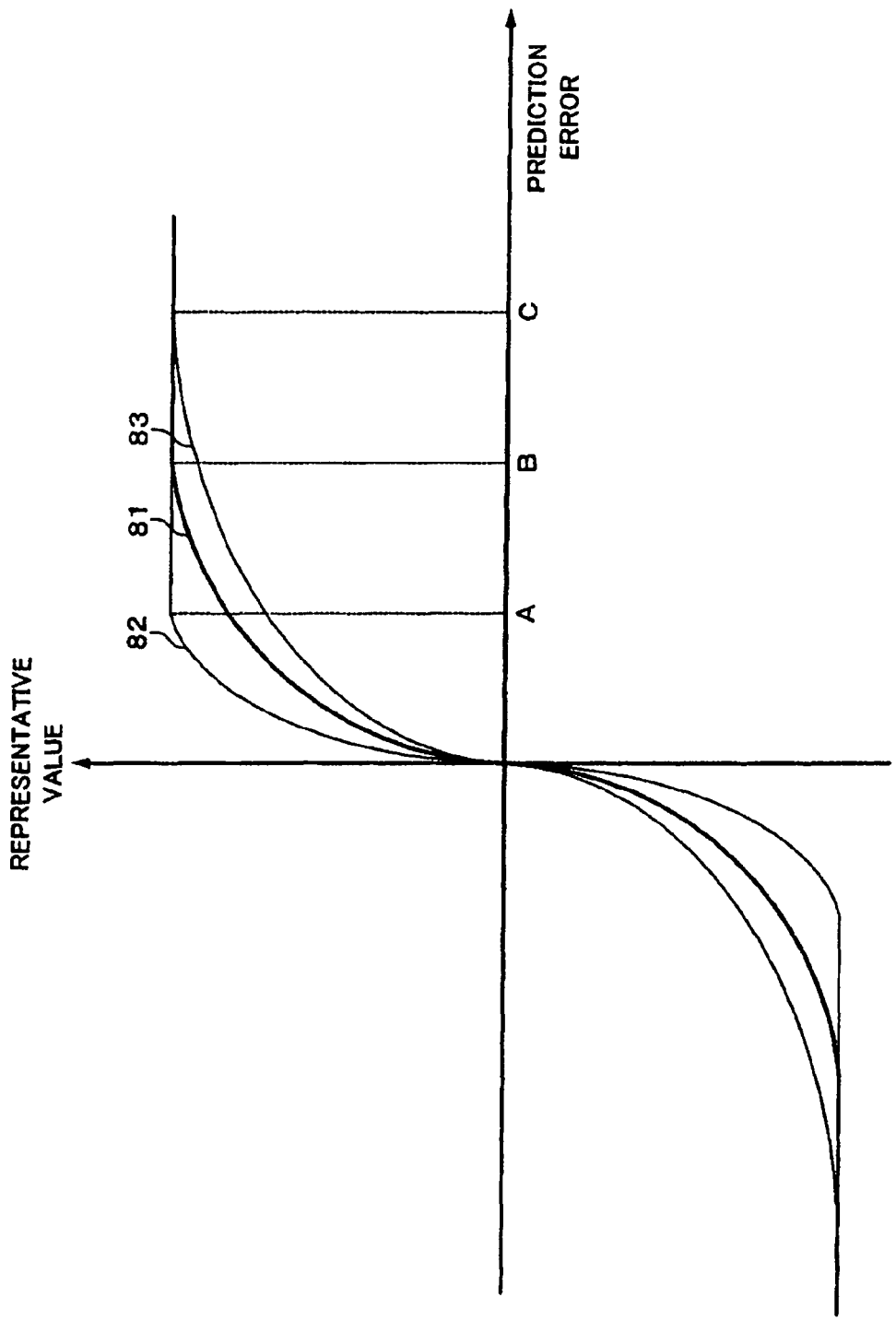
FIG. 11 is a schematic diagram showing an example of a quantization table of the DPCM compressing unit according to the embodiment of the present invention.

FIG. 11 shows an example of the quantization table TB2 where the horizontal axis and the vertical axis represent prediction errors and representative values, respectively. Reference numeral 81 represents a standard quantization table. A quantization table 82 and a quantization 83 are set up to the quantization table 81. In these quantization tables, based on the fact that the sensitivity of human eyes is higher for a portion having a large difference than for a portion having a small difference, the compression ratio of a portion having a large prediction error is caused to be higher than the compression ratio of a portion having a small prediction error.

As shown in FIG. 10A, the quantization table 82 is set up to an image of which prediction errors are distributed in a region of small values, namely a flat image. In the quantization table 82, representative values that are different are output for prediction errors in the range of relatively small levels from 0 to threshold value A. In contrast, in the quantization table 82, only a maximum representative value is output for prediction errors in the range of levels that exceed threshold value A. In other words, many bits are assigned to low levels of prediction errors. In this example, the number of bits that occur in one image such as one frame is a predetermined value or less. Thus, to decrease the compression distortion, it is necessary to decide the numbers of bits assigned to prediction errors.

As shown in FIG. 10B, the quantization table 81 is set up to a normal image of which prediction errors are relatively evenly distributed in the range of small levels to some extent. In the quantization table 81, representative values that are different are output for prediction errors in the range of levels from 0 to threshold value B (>A). In contrast, in the quantization table 81, only a maximum representative value is output for prediction errors in the range of levels that exceed threshold value B. In other words, many bits are assigned to low levels to intermediate levels of prediction errors.

As shown in FIG. 10C, the quantization table 83 is set up to an image of which prediction errors are distributed in the range of large levels, namely an image in which adjacent pixels have less correlation with each other because of a fine image pattern. In the quantization table 83, representative values that are different are output for prediction errors in the range of levels from 0 to threshold value C (>B). In the quantization table 83, only a maximum representative value is output for prediction errors in the range of levels that exceed C. In other words, bits are assigned to prediction errors in the range from small levels to large levels.

As described above, a quantization table is set up corresponding to the distribution of levels of prediction errors of one captured still picture. As a result, quantization can be performed with small compression distortion.

Figure 12:
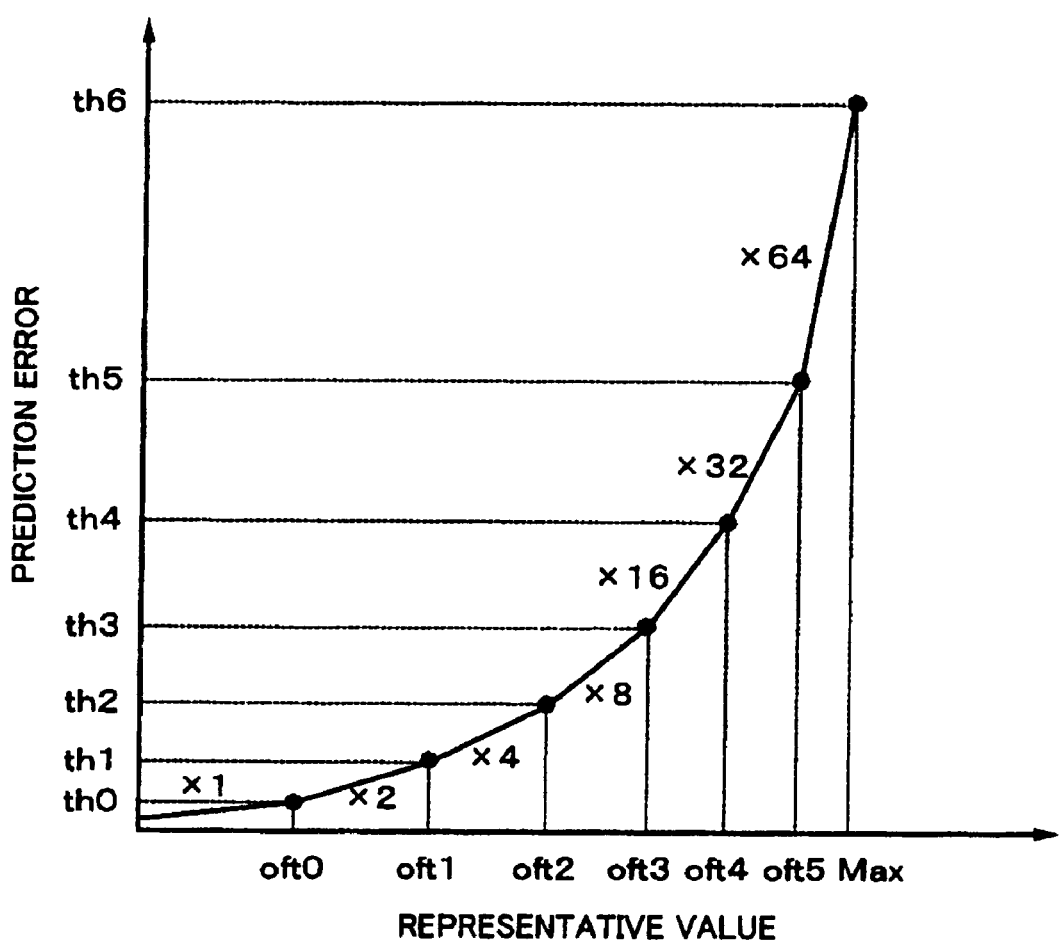
FIG. 12 is a schematic diagram showing an example of which a quantization table of the DPCM compressing unit according to the embodiment of the present invention is represented by a broken line curve.

As shown in FIG. 12, in reality, a quantization table can be approximated by characteristics of broken lines. In FIG. 12, the vertical axis and the horizontal axis represent prediction errors and representative values, respectively. Threshold values th0 to th6 are defined for prediction errors. Offsets oft0 to oft5 are defined for representative values. Straight lines defined by these threshold values and offsets have slopes such that transform coefficients multiplied by prediction errors become (1, ½, ¼, ⅛, 1/16, 1/32, and 1/64).

Data of pairs of threshold values and offset values have been stored in the memory. Threshold values and prediction errors are compared and straight lines in which prediction errors are contained are decided. As a result, representative values corresponding to the prediction errors are obtained. In this case, representative values are obtained by calculating linear interpolations. By changing at least one of a threshold value and an offset value, characteristics of a quantization table can be changed.

Thus, according to this embodiment of the present invention, since two different compressing means of nonlinear transform compression using a visual characteristic that the sensitivity of human eyes is high for a low gradation portion and DPCM compression using both difference sensitivity that the sensitivity of human eyes is high for a portion having small difference and correlation of an image signal are provided, a quantizing error is dispersed such that the user does not become aware of noises. In addition, the nonlinear compression/decompression transform table is adaptively changed such that bits are assigned according to a histogram. Moreover, a quantization table is optimally changed according to a histogram distribution of prediction errors. As a result, representative values are assigned according to a distribution of prediction errors.

As a result, a compression ratio can be increased, while visibility of noises does not change after signal processes are performed. With an increase of the compression ratio, the number of still images stored in the image memory can be increased. In addition, with a decreased frequency band in which the image memory is accessed and decreased power consumption, the service lives of batteries of the digital still camera and camera recorder can be more prolonged.

Figure 13:
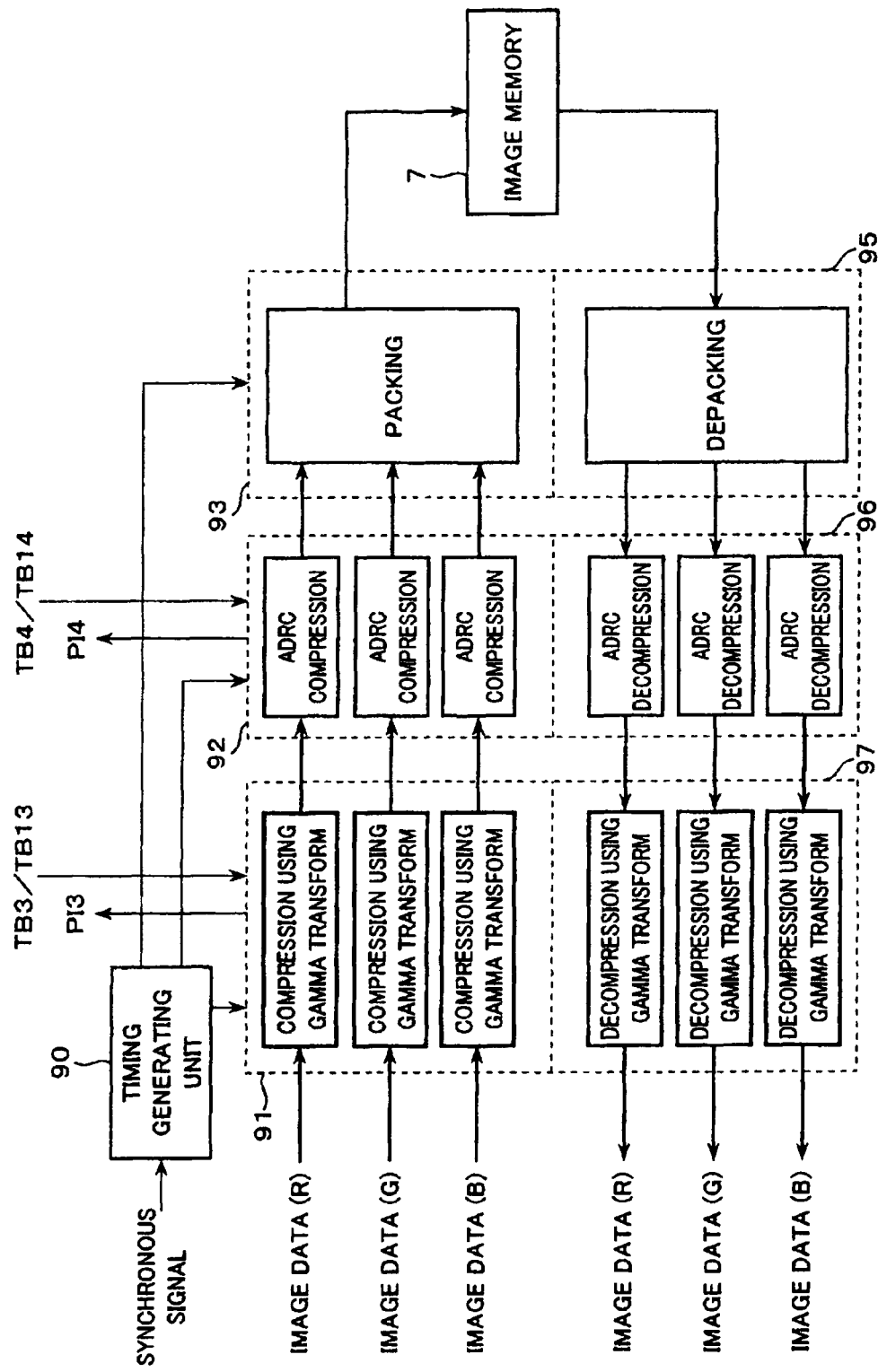
FIG. 13 is a block diagram showing another example of the structure of the compressing/decompressing unit of the image processing section.

FIG. 13 shows another embodiment of the present invention. In this embodiment, as two compression transforming processes having different characteristics, nonlinear compression and ADRC (Adaptive Dynamic Range Coding) are combined. With reference to FIG. 13, a process of compressing L bits, for example L=14, of a still image to N (N<L) bits, for example N=10, will be described. Since a compressing operation and a decompressing operation are not simultaneously performed, a circuit shown in FIG. 13 can be shared by the compressing operation and the decompressing operation.

A horizontal synchronous signal, a vertical synchronous signal, an enable signal, and so forth of image data are input to a timing generating unit 90. The timing generating unit 90 generates a timing signal and a control signal for compressing units 91 and 92, decompressing units 96 and 97, a packing section 93, a depacking section 95, the image memory 7, and so forth.

The compressing unit 91 that uses nonlinear transform is the same as the compressing unit 41 of the embodiment shown in FIG. 3. In other words, image data (L bits per pixel) of color components of three-color signals are input to the compressing unit 91. The compressing unit 91 extracts luminance information from image information PI3, for example original image data supplied from the front-end 5. The microcomputer 10 identifies a characteristic of the input image from the image information PI3. The microcomputer 10 supplies a compression transform table TB3 that has been set up according to the image information PI3 to the compressing unit 91 that uses nonlinear transform.

The compressing unit 91 that uses nonlinear transform compresses image data to M bits (M<L), for example M=12, according to the compression transform table TB3. A transform curve with which the compressing unit 91 performs nonlinear transform has a characteristic that is the same that of a gamma correction curve used in gamma correction of the signal processing section 21 (see FIG. 1) disposed downstream of the compressing unit 91.

The compressing unit 91 inputs image data, of which L bits have been compressed and transformed to M bits by nonlinear transform, to the ADRC compressing unit 92. The ADRC compressing unit 92 outputs image data that have been compressed finally to N bits (for example, N=10) according to a quantization table TB4 that has been set up according to image information PI4. The compressed image data are input to the packing section 93. After the compressed image data are packed with the bus width of the image memory 7, the image data are stored in the image memory 7.

Next, with reference to FIG. 13, a process of decompressing N bits to L bits will be described. The decompressing process is performed in the reveres order of the foregoing compressing process. As in the compressing process, the decompressing process is performed for individual color signals of three primary color components. Image data stored in the image memory 7 are read and input to the depacking section 95. Compressed data multiplexed with the bus width are restored to N bits of image data by the depacking section 95 and then input to the ADRC decompressing unit 96.

The ADRC decompressing unit 96 decompresses N bits to M bits according to a reverse transform table TB14 paired with the quantization table TB4. The decompressed image data are input to the decompressing unit 97 that uses nonlinear transform. The decompressing unit 97 decompresses the image data to the original number of bits, namely L bits, according to a decompression table TB13 paired with the compression transform table TB3 selected by the compressing unit 91. Original image data of L bits of each color component are supplied from the decompressing unit 97 that uses nonlinear transform to the signal processing section 21 (see FIG. 2). The signal processing section 21 performs digital signal processes such as digital clamp, white balance, gamma correction, interpolation calculation, filter calculation, matrix calculation, luminance generation calculation, and color generation calculation so as to generate an image signal composed of a luminance signal and color difference signals.

The compressing unit 91 that uses nonlinear transform can have the structure shown in FIG. 5, whereas the decompressing unit 97 that uses nonlinear transform can have the structure shown in FIG. 6.

Figure 14:
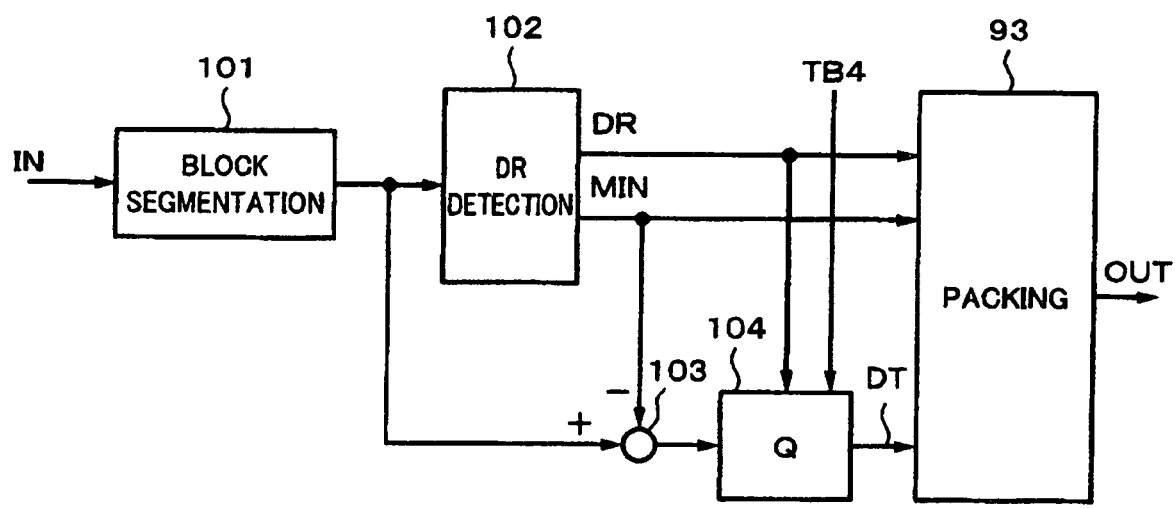
FIG. 14 is a block diagram showing an example of an ADRC compressing unit.
Figure 15:
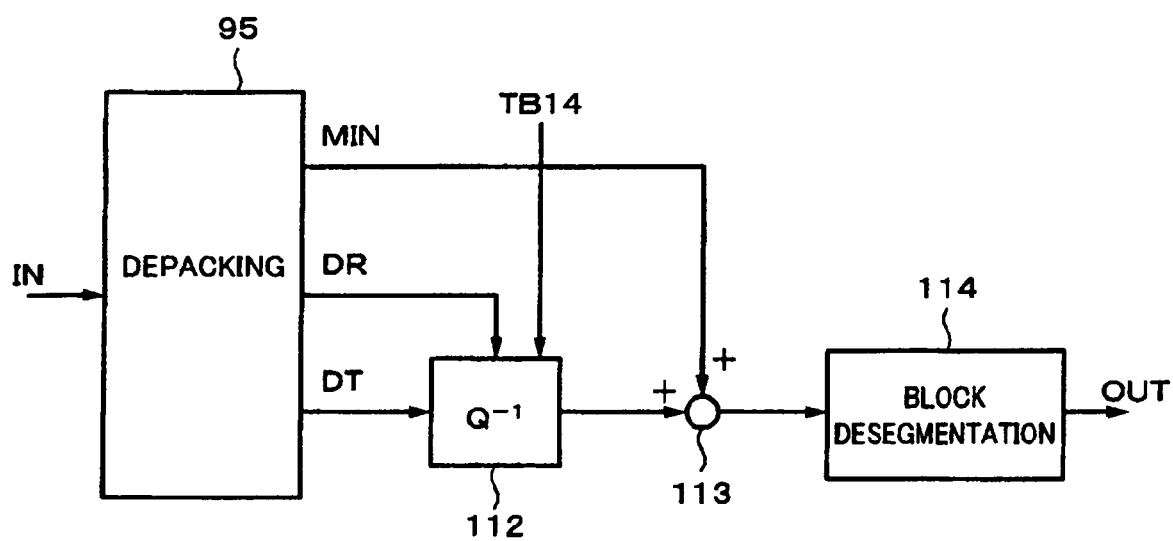
FIG. 15 is a block diagram showing an example of an ADRC decompressing unit.

Since a plurality of pixels that are spatially or chronologically adjacent have much correlation with each other, in ADRC, image data are compressed in the direction of levels of pixels. FIG. 14 shows an example of the compressing unit 91. Pixel data of which each pixel has M bits (data of one color component) are supplied to a block segmenting circuit 101. The block segmenting circuit 101 segments the pixel data into blocks of a two-dimensional region composed of a plurality of pixels. A dynamic range (DR) detecting circuit 102 detects a maximum value MAX and a minimum value MIN of each block and detects a dynamic range DR as a result of MAX−MIN.

A subtracting unit 103 subtracts the minimum value MIN from the value of each pixel. Data supplied to the subtracting unit 103 may be delayed until the data have been detected by the detecting circuit 102. The subtracting unit 103 normalizes data of each block. Output data of the subtracting unit 103 are supplied to a quantizing unit 104.

The quantizing unit 104 performs quantization using the quantization table TB4 and the dynamic range DR and outputs a code DT of N bits. In linear quantization, a quantizing step $\Delta$ to which the dynamic range DR is multiplied by $\frac{1}{2^N}$ is generated and data excluding a minimum value is divided by the quantizing step $\Delta$. In this example, the quantizing unit 104 performs nonlinear quantization according to the quantization table TB4 that is the same as the quantization table of the DPCM compressing unit 42 of the foregoing embodiment and changes the quantizing characteristic according to a characteristic of the image, for example a histogram of a level distribution of the foregoing embodiment.

For example, the quantizing step $\Delta$ is not constant. Instead, the quantizing step $\Delta$ is changed in a plurality of ranges into which the levels of data excluding the minimum value are divided. In other words, in the range of which the levels of data excluding the minimum value are small, the quantizing step is decreased. In the range of which the levels are large, the quantizing step is increased. Thus, the quantizing step is not constant. Instead, the quantizing step is changed according to a histogram of a level distribution.

Information (not shown) that represents the dynamic range DR, the minimum value MIN, the code DT, and the quantization table TB4 are packed by the packing section 93 and written to the image memory 7. The information that represents the quantization table TB4 may be stored in the microcomputer 10.

Data that have been read from the image memory 7 are depacked by the depacking section 95 and the dynamic range DR and the code DT are supplied to a dequantizing unit 112. The reverse transform table TB14 paired with the quantization table TB4 is also supplied to the dequantizing unit 112. The reverse transform table TB14 is identified according to information that denotes that quantization has been performed according to the quantization table TB4.

The dequantizing unit 112 transforms the code DT to a representative value according to the reverse transform table TB14. In linear quantization, the quantizing step $\Delta$ is obtained from the dynamic range DR. By multiplying the value of the code DT by the quantizing step $\Delta$, a representative value is obtained. With the quantizing step $\Delta$ defined according to the reverse transform table TB14, a representative value is calculated.

In the ADRC process, each block is independently quantized. Thus, when a block has much correlation, namely the dynamic range DR is small, a high compression ratio can be obtained. In contrast, when a block does not have much correlation, namely the dynamic range DR is large, there is a possibility that different quantization between blocks results in a block distortion. On the other hand, in the compressing process that uses nonlinear transform, although the structure can be simplified, the higher the compression ratio becomes, the more the information of lower bits is lost. As a result, image quality deteriorates as in solarization.

In this embodiment of the present invention, since compressing processes having different compression characteristics are performed in series, a higher compression ratio can be obtained than otherwise. In addition, compression distortion is dispersed to noises having different characteristics. Thus, visible deterioration of the image quality can be suppressed.

The present invention is not limited to the foregoing embodiments. Instead, various modifications and ramifications of these embodiments may be made. According to the present invention, the number of bits that each compressing unit connected in series compresses is fixed. For example, a first-staged compressing unit compresses L bits to M bits. A second-staged compressing unit compresses M bits to N bits. Instead, (L−N) bits to be compressed and assigned to each compressing unit may be changed according to a characteristic of an image to be processed.

In addition, compressing/decompressing units are provided for individual color components of color signals. However, to reduce the circuit scale, all color components may be multiplexed and processed by a time division process. In addition, the present invention can be applied to the case of which an image sensor has color filters of four or more colors. In addition, according to the present invention, the same number of bits are assigned to each color component. Instead, by changing the number of bits assigned to each color component, namely changing the compression ratio depending on deviation of arrangement of color components, a higher compression ratio is expected to be obtained. In addition, different number of bits may be assigned to color components depending on weights of color components in signal processes performed on downstream stages and an arrangement condition of color filters.

In addition, the present invention can be applied not only to the case of which a still image that is being monitored is captured, but also to the case of which a still image is captured while a moving image is being recorded.

The processing means according to the foregoing embodiments may not be a method having a sequence of steps. Instead, the processing means may be a program that causes a computer to execute a sequence of means or a record medium on which the program is stored.

DESCRIPTION OF REFERENCE NUMERALS

1 IMAGE CAPTURING APPARATUS
3 IMAGING DEVICE
6 IMAGE PROCESSING SECTION
7 IMAGE MEMORY
10 MICROCOMPUTER
41, 91 COMPRESSING UNIT THAT USES NONLINEAR TRANSFORM
42 DPCM COMPRESSING UNIT
46 DPCM DECOMPRESSING UNIT
47, 97 DECOMPRESSING UNIT THAT USES NONLINEAR TRANSFORM
92 ADRC COMPRESSING UNIT
96 ADRC DECOMPRESSING UNIT

The invention claimed is:
1. An image data processing apparatus which compresses original image data captured by an imaging device, comprising:

means for obtaining signals of same color components of color filters;

first compressing means for performing a first compressing process of compressing L bits to M (<L) bits for each pixel of image data separated into the same color components;

second compressing means, connected to the first compressing means in series, for performing a second compressing process, which is different from the first compressing process in characteristics of distortion which occurs, of compressing M bits to N (<M) bits for each pixel, the second compressing means including a quantizing/dequantizing unit which simultaneously performs a quantizing process and a dequantizing process within a feedback loop;

an image memory for storing data compressed by the second compressing means;

second decompressing means for performing a second decompressing process, which is a reverse process of the second compressing process, of decompressing N bits to M bits for each pixel of data stored in the image memory, the second decompressing means including a dequantizing unit having a dequantizing characteristic that is the same as a dequantizing characteristic of the quantizing/dequantizing unit;

first decompressing means, connected to the second decompressing means in series, for performing a first decompressing process, which is a reverse process of the first compressing process, of decompressing M bits to L bits for each pixel of output data of the second decompressing means; and signal processing means for performing a signal process including gamma correction for image data which are output from the first decompressing means, the feedback loop including a predicting unit that is shared by the second compressing means and the second decompressing means.

2. The image data processing apparatus as set forth in claim 1, further comprising:

first and second image information extracting means for extracting image information necessary to decide compression transform rules suitable for an image and a compression method when the first and second compressing means perform their compressing processes, respectively;

compression transform rule setting means for setting up the compression transform rules for the first and second compressing means according to the extracted image information; and decompression transform rule setting means for setting up decompression transform rules for the first and second decompressing means, respectively.

3. The image data processing apparatus as set forth in claim 2, wherein the compression transform rules are transform characteristics for the first and second compressing means, respectively, and wherein the decompression transform rules are reverse transform characteristics for the first and second decompressing means, respectively.

4. The image data processing apparatus as set forth in claim 2, wherein the compression transform rules are compression assignments for the first and second compressing means, respectively, and wherein the decompression transform rules are decompression assignments for the first and second decompressing means, respectively.

5. An image data processing method of compressing original image data captured by an imaging device, the method comprising the steps of:

extracting signals of same color components of color filters;

performing a first compressing process of compressing L bits to M (<L) bits for each pixel of image data separated into the same color components;

performing a second compressing process, which is different from the first compressing process in characteristics of distortion which occurs, of compressing M bits to N (<M) bits for each pixel, the second compressing step being performed after the first compressing step, the second compressing process including performing a quantizing within a feedback loop that includes a quantizing/dequantizing unit which simultaneously performs a quantizing process and a dequantizing process;

storing data compressed at the second compressing step to an image memory;

performing a second decompressing process, which is a reverse process of the second compressing process, of decompressing N bits to M bits for each pixel of data stored in the image memory, the second decompressing process including the use of a dequantizing unit having a dequantizing characteristic that is the same as a dequantizing characteristic of the quantizing/dequantizing unit;

performing a first decompressing process, which is a reverse process of the first compressing process, of decompressing M bits to L bits for each pixel of output data of the second decompressing step, the first decompressing step being preformed after the second decompressing step; and performing a signal process including gamma correction for image data decompressed at the first decompressing step, the feedback loop including a predicting unit that is shared by the second compressing process and the second decompressing process.

6. A non-transitory computer-readable medium storing a program which causes a computer to execute an image data processing method, the method comprising the steps of:

extracting signals of same color components of color filters of an imaging device;

performing a first compressing process of compressing L bits to M (<L) bits for each pixel of image data separated into the same color components;

performing a second compressing process, which is different from the first compressing process in characteristics of distortion which occurs, of compressing M bits to N (<M) bits for each pixel, the second compressing step being performed after the first compressing step, the second compressing process including performing a quantizing within a feedback loop that includes a quantizing/dequantizing unit which simultaneously performs a quantizing process and a dequantizing process;

storing data compressed at the second compressing step to an image memory;

performing a second decompressing process, which is a reverse process of the second compressing process, of decompressing N bits to M bits for each pixel of data stored in the image memory, the second decompressing process including the use of a dequantizing unit having a dequantizing characteristic that is the same as a dequantizing characteristic of the quantizing/dequantizing unit;

performing a first decompressing process, which is a reverse process of the first compressing process, of decompressing M bits to L bits for each pixel of output data of the second decompressing step, the first decompressing step being preformed after the second decompressing step; and performing a signal process including gamma correction for image data decompressed at the first decompressing step, the feedback loop including a predicting unit that is shared by the second compressing process and the second decompressing process.

* * * * *